United States Patent [19]

Koivunen et al.

[11] 4,223,569

[45] Sep. 23, 1980

[54] TRANSVERSE TRANSMISSION WITH PARALLEL, COPLANAR AXIS

[75] Inventors: Erkki A. Koivunen, Livonia; James F. Sherman, Brighton, both of Mich.

[73] Assignee: General Motors Corporation, Detroit, Mich.

[21] Appl. No.: 956,062

[22] Filed: Oct. 30, 1978

[51] Int. Cl.[2] .................... F16H 37/06; F16H 37/08
[52] U.S. Cl. ................... 74/665 GE; 74/695; 74/705
[58] Field of Search ............ 74/705, 665 GE, 665 F, 74/665 G, 695

[56] References Cited

U.S. PATENT DOCUMENTS

| | | | |
|---|---|---|---|
| 2,225,720 | 12/1940 | Snow | 74/695 |
| 2,821,868 | 2/1958 | Gregory | 74/665 F X |
| 2,856,794 | 10/1958 | Simpson | 74/732 X |
| 3,029,662 | 4/1962 | Hause | 74/695 |
| 3,090,256 | 5/1963 | Hause | 74/695 X |
| 3,424,031 | 1/1969 | Stockton | 74/695 |
| 3,722,300 | 5/1973 | Crooks | 74/705 X |
| 3,800,626 | 4/1974 | Koivunen | 74/695 |
| 3,977,272 | 8/1976 | Neumann | 74/695 X |

Primary Examiner—Leslie Braun
Attorney, Agent, or Firm—Donald F. Scherer

[57] ABSTRACT

An automatic transmission for use with a vehicle wherein the engine and transmission are transversely disposed relative to the longitudinal axis of the vehicle. A unitary transmission housing encloses the transmission components so that the torque converter and control pump are disposed on one axis of the housing while the gearing, control elements and final drive are disposed on another axis parallel to the one axis.

2 Claims, 3 Drawing Figures

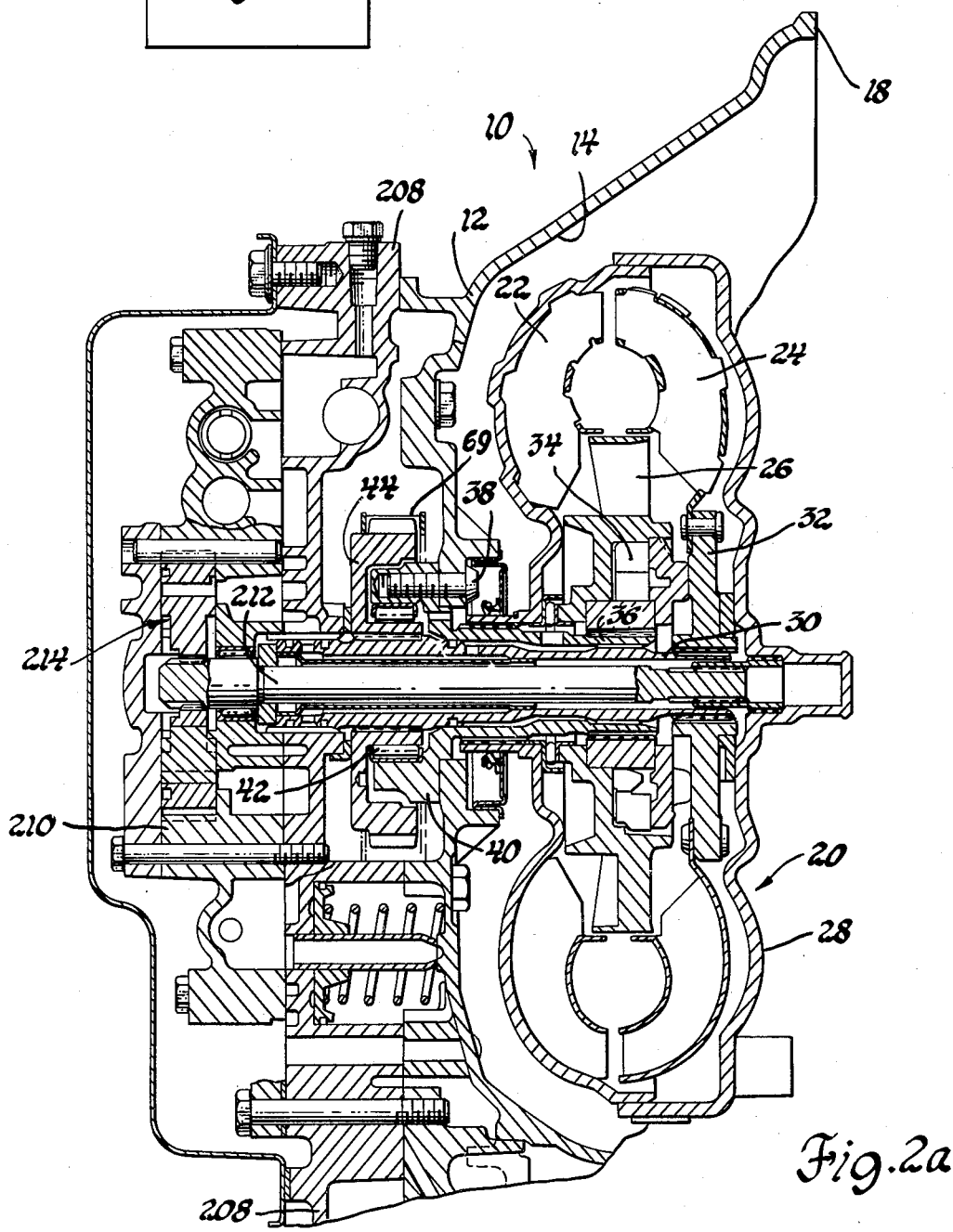

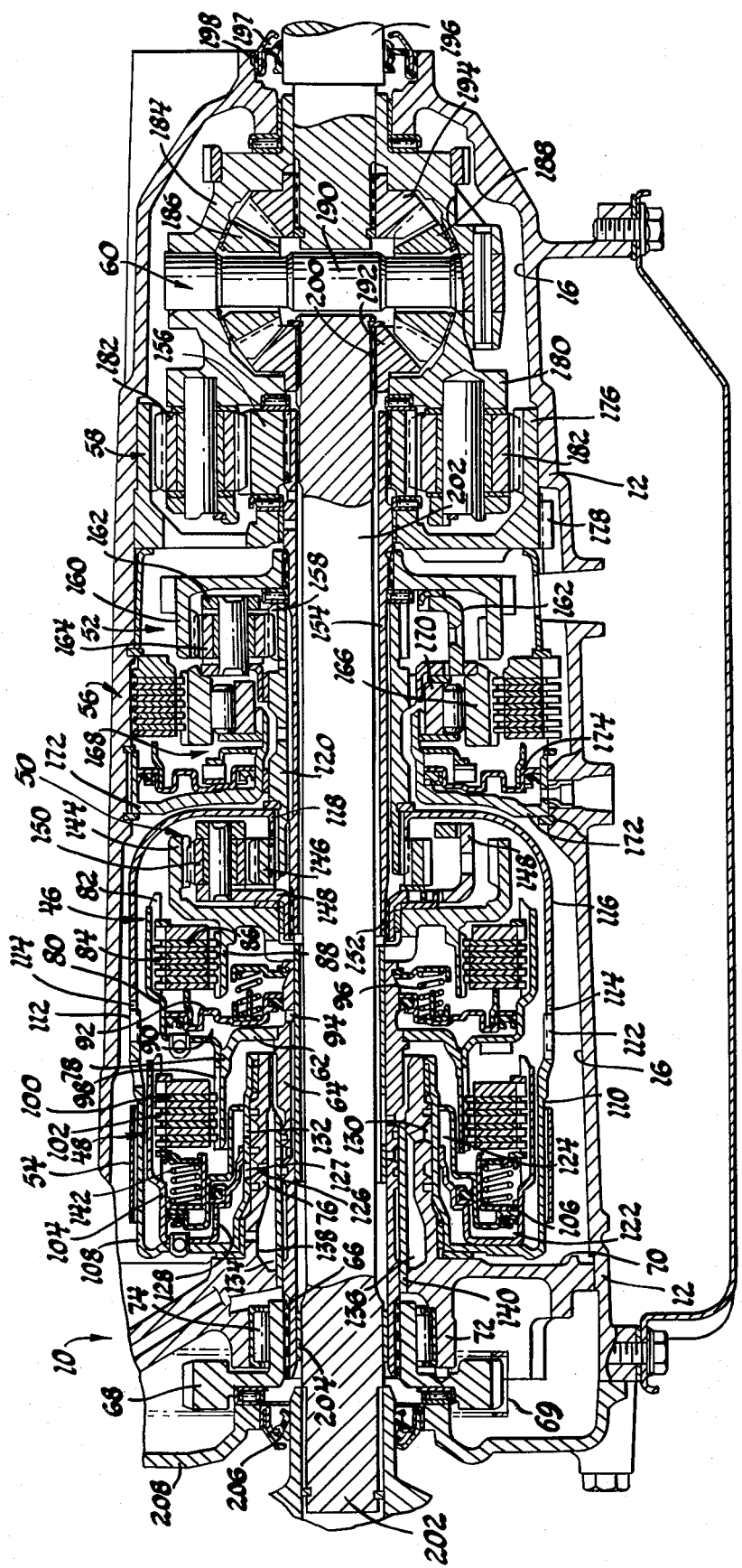

TRANSVERSE TRANSMISSION WITH PARALLEL, COPLANAR AXIS

This invention relates to automatic transmissions and more particularly to such transmissions wherein the components thereof are disposed on more than one axis.

It is an object of this invention to provide an improved automatic transmission for a front wheel drive vehicle having a transversely disposed engine and transmission wherein the transmission has a unitary housing for the torque converter on a first axis, and the ratio gear, final drive gearing and control elements on a second axis parallel to and coplanar with the first axis.

Other objects and advantages of the present invention will be more apparent from the following description and drawings in which:

FIG. 1 is a block diagram showing the relative positioning of FIGS. 2a and 2b; and FIGS. 2a and 2b are elevational cross sectional views of a transmission incorporating the present invention.

There is seen in FIGS. 2a and 2b a transmission 10 including a unitary housing 12 having an upper bell-shaped cavity 14 and a lower generally cylindrical cavity 16. The upper bell-shaped cavity 14 has a large opening 18 which is adapted to be connected to an internal combustion engine, not shown, and disposed in the cavity is a conventional torque converter 20 having an impeller 22, a turbine 24 and a stator 26. The impeller 22 is connected to be driven by the engine through an input shell 28 and the turbine 24 is connected to drive a torque converter output shaft 30 through a splined hub member 32. The stator 26 is connected through a one-way device 34 and a sleeve shaft 36 to the transmission housing 12 by fasteners 38. Also supported on the housing 12, and preferably integral with the sleeve shaft 36, is a bearing support member 40 in which is disposed a needle bearing 42 for rotatably supporting a drive sprocket 44 in which is splined the converter output shaft 30. The cylindrical cavity 16 of the transmission housing 12 encloses a forward clutch 46, a direct clutch 48, a pair of ratio planetary gear sets 50, 52, a band brake 54, a disc brake 56, a reduction drive planetary set 58 and a differential gear set 60. The forward clutch 46 and direct clutch 48 include a common input hub 62 which is secured to an input sleeve shaft 64 which is connected through a spline 66 to a driven sprocket 68 which is driven by a chain 69 from the drive sprocket 44. The cylindrical cavity 16 is closed by an end cap 70 which provides a bearing support 72, through a needle bearing 74, for the driven sprocket 68. The end cap 70 has a cylindrical sleeve shaft portion 76 which rotatably supports the direct clutch 48.

The input hub 62 has oppositely facing radially spaced cylindrical surfaces which provide the input hubs 78, 80 for the direct clutch 48 and forward clutch 46, respectively. The forward clutch input hub 80 has an internal spline 82 formed thereon to which are drivingly connected a plurality of friction discs 84. Alternately spaced with the friction discs 84 are another set of friction discs 86 which are splined at their inner diameter to an output hub 88. The input hub 80 and input sleeve shaft 64 cooperate to form a chamber 90 in which is slidably disposed a sheet metal piston 92, which may be pressurized through a passage 94, to be moved axially, against a plurality of return springs 96, to engage the friction discs 84, 86 thereby creating a friction drive connection between the input hub 62 and output hub 88 of the forward clutch 46.

The input hub 78 for the direct clutch 48 has an external spline 98 formed thereon to which are drivingly connected a plurality of friction discs 100 which are interspaced with a plurality of friction discs 102 splined to a piston housing 104 in which is slidably disposed a sheet metal piston 106. The piston housing 104 is secured to a drum 108 which has a smooth outer cylindrical surface 110 encircled by the band brake 54. The drum 108 has a plurality of axially facing teeth 112 formed thereon which are engaged with complementary teeth 114 formed in a cup-shaped direct clutch output member 116 which has a splined inner diameter 118 drivingly connected to a sun gear sleeve shaft 120. The direct clutch 48 is engaged in both the forward direct drive and in the reverse drive by application of fluid pressure to chambers 122, 124, formed between the piston housing 104 and piston 106. Chamber 122 is pressurized through passages 126, 127, 128 which are formed in the cylindrical sleeve shaft portion 76 of the end cap 70, the drum 108 and housing 104, respectively. Chamber 124 is pressurized through passages 130, 132 formed in the cylindrical sleeve shaft portion 76 and the drum 108. The passages 126 and 130 are in communication with cavities 134 and 136, respectively, which are formed by an oval inner surface 138 on cylindrical sleeve shaft 76 and a cylindrical spacer 140. Pressurizing either or both chambers 122 and 124 will move the piston 106 into engagement with the friction discs 100 in a well known manner. A plurality of return springs 142 effect disengagement of the clutch when the pressure is exhausted.

The output hub 88 of the forward clutch 46 is drivingly connected to a ring gear 144 of the ratio planetary gear set 50 which further includes a sun gear 146 drivingly connected to the output member 116 of the direct clutch 48, through the sun gear sleeve shaft 120, and a planetary carrier 148 on which is rotatably supported a plurality of pinion gears 150 meshing with the sun gear 146 and ring gear 144. The carrier 148 is drivingly connected through a spline 152 to an output sleeve shaft 154 which in turn is splined to a sun gear 156 of the reduction planetary gear set 58. The sun gear sleeve shaft 120 has integrally formed thereon a sun gear 158 which is a component in the ratio planetary gear set 52 which also includes a ring gear 160, drivingly connected to the output sleeve shaft 154 and a planetary carrier 162 on which is rotatably supported a plurality of pinion gears 164 meshing with the sun gear 158 and the ring gear 160. The carrier 162 is connected to an outer race 166 of a one-way drive establishing device 168, the inner race 170 of which is connected through a bulkhead 172 to the transmission housing 12 to provide a one-way brake for the carrier 162. The outer race 166 is also connected to the disc brake 56 which is conventional in construction and has spaced interleaved plates connected alternately to the outer race and the transmission housing, respectively. The brake 56 is selectively energized in a conventional manner by a hydraulically actuated piston 174 which is slidably disposed in the bulkhead 172.

The reduction planetary gear set 58 includes the sun gear 156, a ring gear 176 which is continuously grounded to the housing 12, through a spline 178, and a planet carrier 180 on which is rotatably supported a plurality of pinion gears 182 meshing with the sun gear 156 and ring gear 176. The planet carrier 180 is integral with a differential carrier 184 which forms a part of the differential gear set 60. Also included in the differential gear set 60 is a pair of pinion gears 186, 188 rotatably supported on a shaft 190 which is secured in the differential carrier 184 and a pair of side gears 192, 194 which mesh with the pinion gears 186, 188. One side gear 194 is connected to an output shaft 196 which extends to the right through a seal 197 secured in a small shaft opening 198 in the lower cavity 16 of the transmission housing 12. The other side gear 192 is drivingly connected through a spline 200 to an output shaft 202 which extends coaxially with the reduction gear set 58, the ratio planetary gear sets 50, 52, the output sleeve shaft 154 and the input sleeve shaft 64. The output shafts 196 and 202 are adapted to be connected through universal joints to the drive wheels of a vehicle, not shown. The output shaft 202 is rotatably supported in a bushing 204 secured in the input sleeve shaft and passes outboard of the transmission housing through a seal 206 secured in an end cover 208 which extends to cover the entire left end of the transmission housing 12. The upper portion of the end cover 208 supports a valve housing 210 containing conventional control valves which are necessary to control the engagement and disengagement of the various clutches and brakes in the transmission, as is well known.

The input shell 28 has splined thereto a pump drive shaft 212 which extends coaxial with and through the torque converter output shaft 30 and drive sprocket 44 into the valve housing 210. Disposed within the valve housing 210 is a positive displacement hydraulic pump 214 which supplies fluid pressure for the torque converter 20, the transmission control, the various clutches and brakes and the lubrication and cooling systems of the transmission. The pump 214 is preferably of a variable displacement design such as that shown in U.S. Ser. No. 927,507 filed July 24, 1978, and assigned to the assignee of the present application, however, a fixed displacement pump will perform satisfactorily. If desired, the end cover 208 may also carry a portion of the transmission control valving.

The planetary ratio gear sets 50 and 52 provide two forward reduction ratios, a forward direct drive ratio and a reverse reduction ratio through the planetary reduction gear set 58 to the differential gear set 60. The forward clutch 46 is engaged to provide a drive connection between the input to the transmission and the ring gear 144 such that when all other friction devices are disengaged, the one-way brake will be active to provide a reaction for a reduction in ratio between the transmission input and the planetary reduction gear set 58. To establish a second gear ratio, the brake band 54 is engaged to prevent rotation of the sun gear 146 such that another reduction ratio between the transmission input and the planetary reduction gear set 58 is provided. Direct drive is established through the engagement of both the direct clutch 48 and forward clutch 46, and release of brake band 54, such that a one-to-one drive ratio is provided in the ratio planetary gear sets 50 and 52. Reverse drive ratio is established by engagement of the direct clutch 48 and the disc brake 56 such that the sun gear 158 is driven forward while the ring gear 160 is driven in reverse thus providing a reverse ratio into the planetary reduction gear set 58. The ratio planetary gear sets function in accordance with the transmission disclosed in U.S. Pat. No. 2,856,794 to Simpson, issued Oct. 21, 1958.

The above described transmission provides a compact mechanism which may be used in a vehicle having the engine and drive mechanism arranged transversely to the longitudinal axis of the vehicle. The axis of the torque converter and the axis of the output shaft, and surrounding components, are parallel and coplanar which contribute to the compactness of this transmission.

The embodiments of the invention in which an exclusive property or privilege is claimed are defined as follows:

1. A multi-speed planetary step ratio transmission adapted to be used with an internal combustion engine for a motor vehicle wherein the engine and transmission are disposed transversely to the longitudinal axis of the vehicle, said transmission comprising; a unitary housing having upper and lower cavities, said upper cavity having an opening extending toward said engine; a torque converter rotatably disposed in said upper cavity, the centerline thereof adapted to be aligned with the centerline of the engine crankshaft, a drive sprocket drivingly connected to the torque converter and being supported on a bearing in a location external to the upper cavity and coaxial with the torque converter axis; said lower cavity being generally cylindrical and having a large opening in one end thereof facing in a direction opposite to the opening in said upper cavity and having a small diameter opening at the other end thereof; a multi-speed planetary gear means disposed in said lower cavity including axially spaced input and output sleeve shafts, a pair of simple interconnected planetary gear units, and a plurality of selectively engageable clutch means and brake means for selectively establishing a plurality of step ratios in the planetary gear units between the input and output sleeve shafts; a fixed ratio planetary reduction means having a ring gear secured for nonrotation in said lower cavity, a sun gear driven by said output sleeve shaft of said multi-speed planetary gear means, and a planetary carrier member; a bevel gear differential disposed in said lower cavity adjacent to and intermediate said planetary reduction means and said other end of said lower cavity, and having a differential carrier member drivingly connected to the planetary carrier member of said planetary reduction means, a pair of pinion gears mounted on said differential carrier and a pair of side gears meshing with said pinion gears; a first transmission output shaft drivingly connected to one of said side gears and extending through and rotatably supported in said small diameter opening in said lower cavity; a second transmission output shaft drivingly connected to said other side gear and extending coaxially with and through said planetary reduction unit, said output and input sleeve shafts of said multi-speed planetary gear means and extending outwardly from the large opening of said lower cavity; an end cap secured in said large opening of said lower cavity being disposed to rotatably support the input sleeve shaft of said multi-speed planetary gear means; a driven sprocket drivingly connected to said input sleeve shaft of said multi-speed planetary gear means and being rotatably supported in said wall portion; a chain member drivingly connecting said drive sprocket and said driven sprocket; and an end cap member enclosing said drive and driven sprockets and having a seal member disposed therein for sealing the outer diameter of said second output shaft.

2. A multi-speed planetary step ratio transmission adapted to be used with an internal combustion engine for a motor vehicle wherein the engine and transmission are disposed transversely to the longitudinal axis of the vehicle, said transmission comprising; a unitary housing having upper and lower cavities, said upper cavity having an opening extending toward said engine; a torque converter rotatably disposed in said upper cavity, the centerline thereof adapted to be aligned with the centerline of the engine crankshaft; a drive sprocket drivingly connected to the torque converter and being supported on a bearing in a location external to the upper cavity and coaxial with the torque converter axis; said lower cavity being generally cylindrical and having a large opening in one end thereof facing in a direction opposite to the opening in said upper cavity and having a small diameter opening at the other end thereof; a multi-speed planetary gear means disposed in said lower cavity including axially spaced input and output sleeve shafts, a pair of simple interconnected planetary gear units, and a plurality of selectively engageable clutch means and brake means for selectively establishing a plurality of step ratios in the planetary gear units between the input and output sleeve shafts; a fixed ratio planetary reduction means having a ring gear secured for nonrotation in said lower cavity, a sun gear driven by said output sleeve shaft of said multi-speed planetary gear means, and a planetary carrier member; a bevel gear differential disposed in said lower cavity adjacent to and intermediate said planetary reduction means and said other end of said lower cavity, and having a differential carrier member drivingly connected to the planetary carrier member of said planetary reduction means, a pair of pinion gears mounted on said differential carrier and a pair of side gears meshing with said pinion gears; a first transmission output shaft drivingly connected to one of said side gears and extending through and rotatably supported in said small diameter opening in said lower cavity; a second transmission output shaft drivingly connected to said other side gear and extending coaxially with and through said planetary reduction unit, said output and input sleeve shafts of said multi-speed planetary gear means and extending outwardly from the large opening of said lower cavity; an end cap secured in said large opening of said lower cavity being disposed to rotatably support the input sleeve shaft of said multi-speed planetary gear means; a driven sprocket drivingly connected to said input sleeve shaft of said multi-speed planetary gear means and being rotatably supported in said wall portion; a chain member drivingly connecting said drive sprocket and said driven sprocket; an end cap member enclosing said drive and driven sprockets and having a seal member disposed therein for sealing the outer diameter of said second output shaft; a valve housing secured to said end closure; a fluid pump rotatably supported in said valve body coaxial with said torque converter; and a pump shaft extending coaxially through said torque converter and said drive sprocket and being drivingly connected between the input to said torque converter and said fluid pump.

* * * * *